Figure 1:
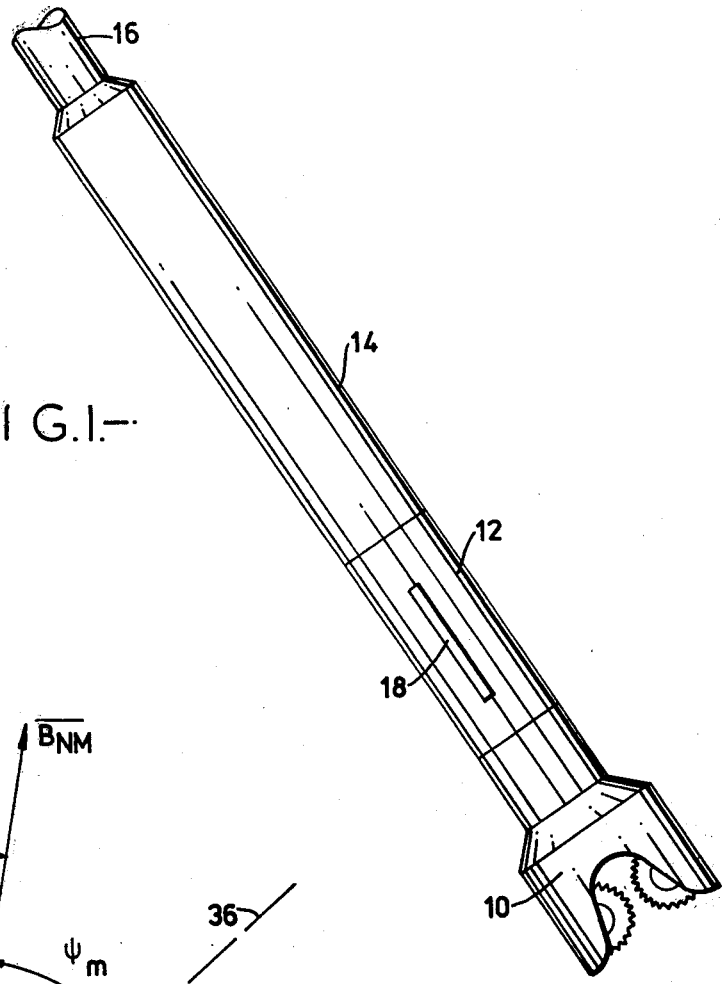

United States Patent [19]

Russell et al.

[11] 4,163,324
[45] Aug. 7, 1979

[54] SURVEYING OF BOREHOLES

[76] Inventors: Michael K. Russell, Lynworth House, Prestbury, Cheltenham; Anthony W. Russell, The Bittams, Crippetts Rd., Leckhampton, Cheltenham, both of England

[21] Appl. No.: 880,873

[22] Filed: Feb. 23, 1978

[30] Foreign Application Priority Data

Feb. 25, 1977 [GB] United Kingdom ................. 8007/77

[51] Int. Cl.² .......................................... E21B 47/022
[52] U.S. Cl. ................................................... 33/313
[58] Field of Search .......................... 33/304, 312, 313

[56] References Cited

U.S. PATENT DOCUMENTS

| 3,791,043 | 2/1974 | Russell | 33/312 |
|---|---|---|---|
| 3,862,499 | 1/1975 | Isham et al. | 33/312 |
| 3,935,642 | 2/1976 | Russell | 33/312 |

Primary Examiner—Steven L. Stephan
Attorney, Agent, or Firm—Young & Thompson

[57] ABSTRACT

When surveying a borehole using an instrument responsive to the earth's magnetic field, the assumption is made that the error vector which comprises the difference between the true earth's magnetic field and the measured magnetic field in the borehole is in the direction of the borehole axis. The magnitude of this error vector is determined and used to correct the magnetically measured azimuth.

7 Claims, 7 Drawing Figures

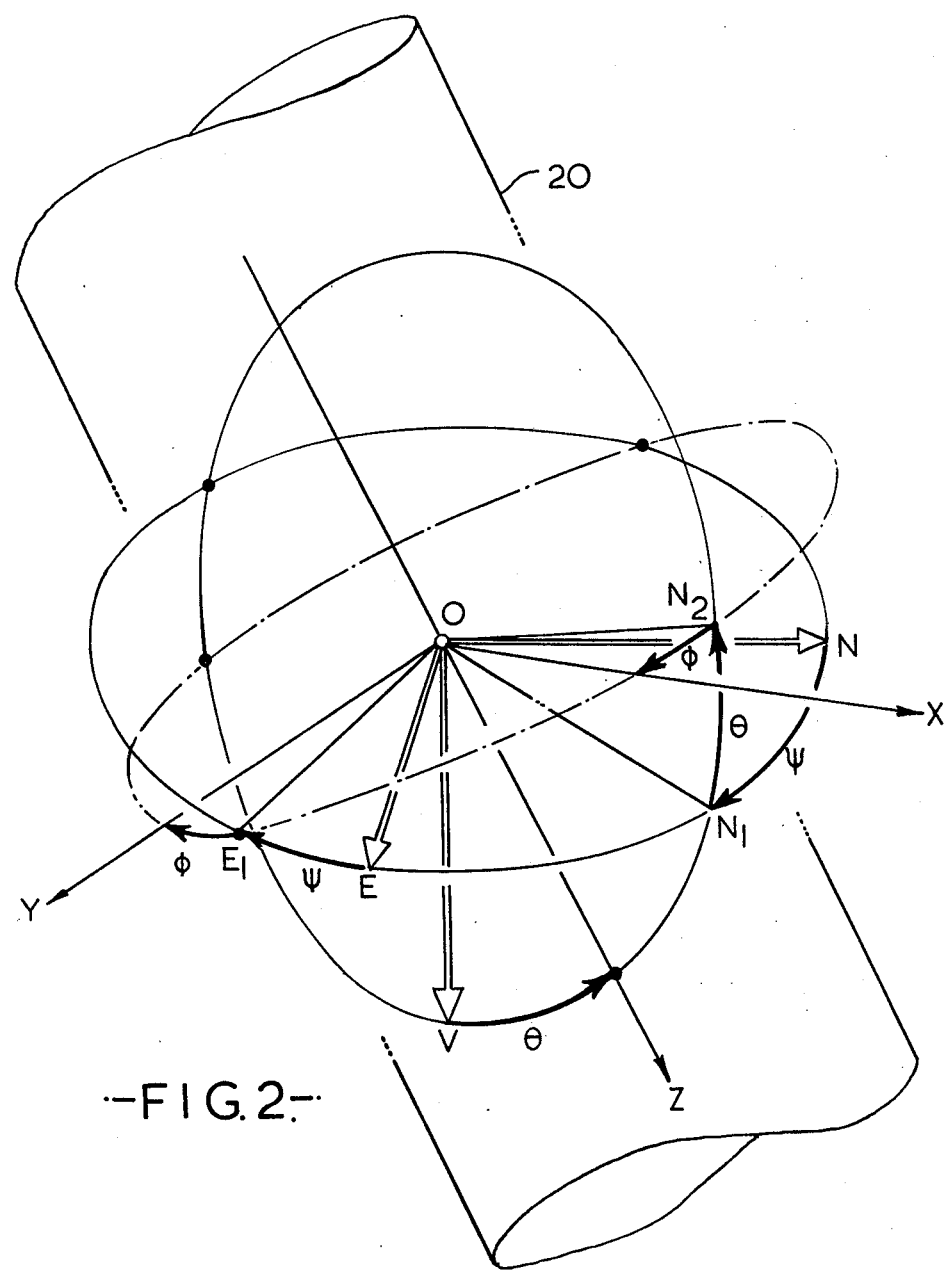
-FIG.2-

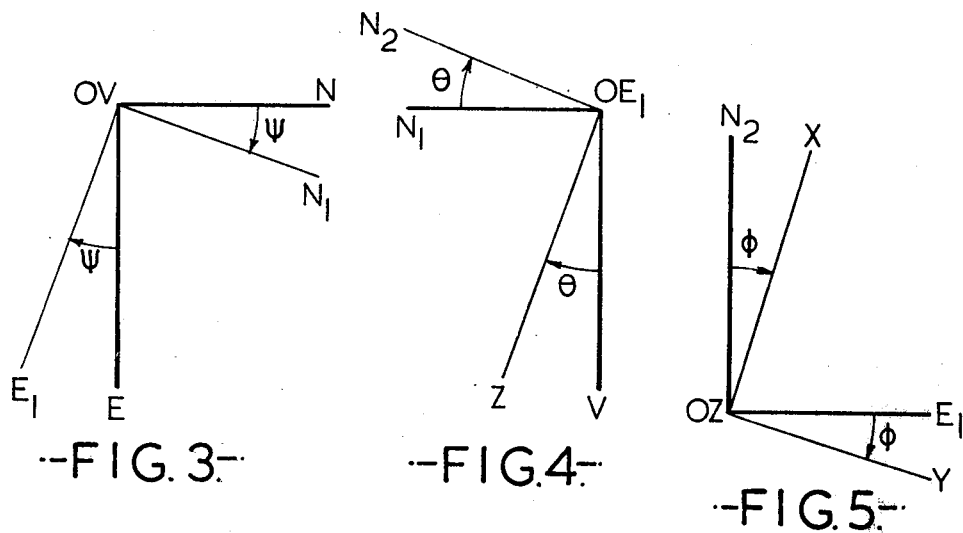
-FIG. 3-  -FIG. 4-  -FIG. 5-
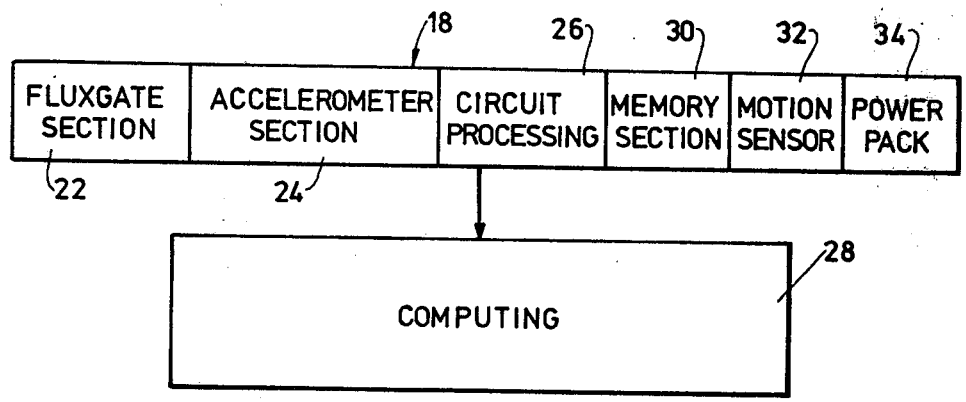
-FIG. 6-

SURVEYING OF BOREHOLES

This invention relates to the surveying of boreholes and to the provision of an instrument for this purpose. It is particularly concerned with the determination of the azimuth of a borehole.

At present "pivoted compass" single-shot and multi-shot instruments are used for this purpose. However, with such instruments, the necessary correction to compensate for the modification of the earth's magnetic field in the vicinity of the instruments can only be performed by assuming the size and direction of the error field caused by the instrument and also requires a knowledge of the magnetic moment of the compass magnet. This procedure is, by its nature, necessarily largely empirical.

The present invention is concerned with the determination of the azimuth of a borehole without making any assumptions other than that the error vector which modifies the earth's magnetic vector at the instrument is in the direction of the borehole at the survey station. This assumption is amply justified in that, while the instrument can be mounted in a non-magnetic housing in form of a drill collar, the other components of the drill string above and below the instrument will usually be constructed substantially completely of magnetic materials. The effect of this assumption is that the magnitude of the error vector can be determined from the difference between the true and apparent values of the components of the earth's magnetic field in a single direction which is not perpendicular to the axis of the borehole. The invention is not applicable to the surveying of boreholes which are cased with a steel lining.

According to the invention there is provided a method of determining the orientation of a surveying instrument in a borehole comprising the steps of determining the inclination angle of the instrument at the location thereof in the borehole, sensing, at said location, at least one vector component of the local magnetic field to determine the local magnetic field in the direction of a primary axis of the instrument aligned with the borehole, determining the azimuth angle of the instrument relative to the apparent magnetic north direction at said location, ascertaining the true horizontal and vertical components of the earth's magnetic field at the location of the borehole and determining the correction to be applied to the apparent azimuth angle from the true and apparent values for the horizontal and vertical components of the earth's magnetic field.

In one form of the invention, the apparent azimuth angle is determined from the highside angle and three non-coplanar components of the apparent earth's magnetic field. Measurements of the components of the local magnetic field may be effected using three fluxgates which are preferably disposed to measure an orthogonal set of magnetic field components. Subsequent calculations are simplified if one of the components is parallel to the above-mentioned primary axis of the instrument.

The inclination and highside angles are preferably determined by measuring the gravity vector at the instrument. This may be done using three accelerometers which are preferably orthogonal to one another and are conveniently arranged to sense the components of gravity in the same three directions as the fluxgates sense the components of the local magnetic field.

The invention is also concerned with the provision of an instrument for carrying out the above method.

Figure 7:
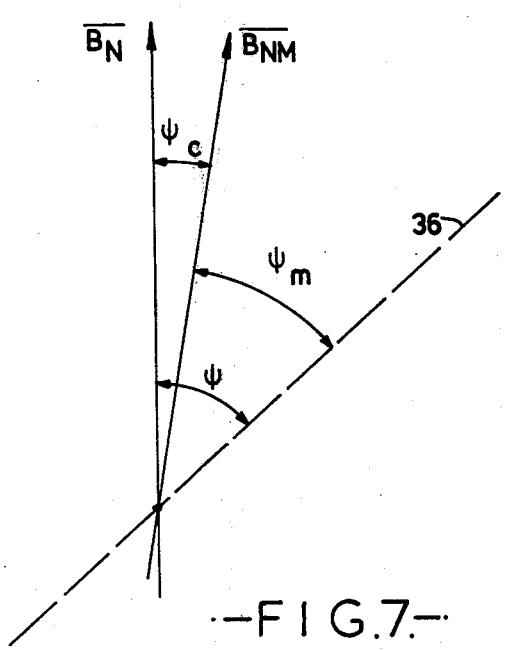

The determination of the inclination and azimuth of an instrument in a borehole, in accordance with the invention, will now be described in more detail with reference to the accompanying drawings in which:

FIG. 1 is a schematic elevational view of a drill string incorporating a survey instrument in accordance with the invention, FIG. 2 is a schematic perspective view illustrating a transformation between earth-fixed axes and instrument-fixed axes, FIGS. 3 to 5 are diagrams illustrating, in two dimensions, the various stages of the transformation shown in FIG. 2, FIG. 6 is a block schematic diagram illustrating the instrument shown in FIG. 1, and FIG. 7 illustrates the relationship between the measured and actual magnetic north directions and the instrument.

Referring to FIG. 1, a drill string comprises a drilling bit 10 which is coupled by a non-magnetic drill collar 12 and a set of drill collars 14, which may be made of magnetic material, to a drill pipe 16. The non-magnetic drill collar 12 contains a survey instrument 18 in accordance with the invention. The instrument 18 comprises three accelerometers arranged to sense components of gravity in three mutually orthogonal directions, one of which is coincident with the longitudinal axis of the drill string, three fluxgates arranged to measure magnetic field strength in the same three mutually orthogonal directions and associated signal processing apparatus, as will be described hereinafter with reference to FIG. 6.

FIG. 2 shows a borehole 20 schematically and illustrates various reference axes relative to which the orientation of the borehole 20 may be defined. A set of earth-fixed axes (ON, OE and OV) are illustrated with OV being vertically down and ON being a horizontal reference direction. A corresponding instrument-case-fixed set of axes OX, OY and OZ are illustrated where OZ is the longitudinal axis of the borehole (and therefore of the instrument case) and OX and OY, which are in plane perpendicular to the borehole axis represented by a chain-dotted line, are the other two above-mentioned directions in which the accelerometers and fluxgates are orientated.

A spatial survey of the path of a borehole is usually derived from a series of measurements of an azimuth angle $\psi$ and an inclination angle $\theta$. Measurements of ($\psi$, $\theta$) are made at successive stations along the path and the distance between these stations are accurately known. The set of case-fixed orthogonal axes OX, OY and OZ are related to an earth-fixed set of axes ON, OE and OV through a set of angular rotations ($\psi$, $\theta$, $\phi$). Specifically, the earth-fixed set of axes (ON, OE, OV) rotates into the case-fixed set of axes (OX, OY, OZ) via three successive clockwise rotations; through the azimuth angle $\psi$ about OV (as shown in FIG. 3), through the inclination angle $\theta$ about $OE_1$ (as shown in FIG. 4) and through the highside angle $\theta$ about OZ (as shown in FIG. 5). If $\overline{U_N}$, $\overline{U_E}$ and $\overline{U_V}$ are unit vectors in the ON, OE and OV directions respectively, then the vector operation equation $$\overline{U_{NEV}} = \{\psi\}\{\theta\}\{\phi\}\overline{U_{XYZ}} \quad (1)$$

represents the transformation between unit vectors in the two frames of reference (ONEV) and (OXYZ) where, $$\{\psi\} = \begin{bmatrix} \cos\psi & -\sin\psi & 0 \\ \sin\psi & \cos\psi & 0 \\ 0 & 0 & 1 \end{bmatrix} \quad (2)$$

$$\{\theta\} = \begin{bmatrix} \cos\theta & 0 & \sin\theta \\ 0 & 1 & 00 \\ -\sin\theta & 0 & \cos\theta \end{bmatrix} \quad (3)$$

$$\{\phi\} = \begin{bmatrix} \cos\phi & -\sin\phi & 0 \\ \sin\phi & \cos\phi & 0 \\ 0 & 0 & 1 \end{bmatrix} \quad (4)$$

The vector operation for a transformation in the reverse direction can be written $$\overline{U_{XYZ}} = \{\phi\}^T \{\theta\}^T \{\psi\}^T U_{NEV} \quad (5)$$

As shown in FIG. 6, the survey instrument 18 comprises a fluxgate section 22 and an accelerometer section 24. The outputs from the three mutually orthogonal fluxgates comprise the components $B_x$, $B_y$ and $B_z$ of the local magnetic field along the axes OX, OY and OZ respectively. Similarly, the outputs from the three accelerometers in the accelerometer section 24 comprise the components $g_x$, $g_y$ and $g_z$ of the local gravitation field along the axes OX, OY and OZ. These six outputs are in the form of proportional voltages which are applied to a circuit processing unit 26 comprising analogue to digital converters. The outputs from the analogue to digital converters in the circuit processing unit 26 are ultimately processed through a digital computing unit 28 to yield values of azimuth $\psi$ and inclination $\theta$. This computing operation may be performed within the survey instrument and the computed values stored in a memory section 30 which preferably comprises one or more solid-state memory packages. However, instead of storing the two computed values $\psi$ and $\theta$, it will usually be more convenient to provide the memory section 30 with sufficient capacity to store all six outputs from the analogue to digital converters in the circuit processing unit 26 and to provide the computing unit 28 in the form of a separate piece of apparatus to which the instrument is connected after extraction from the borehole.

The instrument 18 also comprises a motion sensor 32 arranged to detect motion of the instrument within the earth's reference frame so that survey measurements are made only when the instrument is stationary within that frame. Power for the instrument is supplied by a battery power pack 34.

The computing operation performed by the computing unit 28 will now be described. The first stage is to calculate the inclination angle $\theta$ and the highside angle $\phi$. Use of the Vector Operation Equation 5 to operate on the gravity vector $$\begin{bmatrix} 0 \\ 0 \\ g \end{bmatrix}$$

yields gravity components in the OXYZ frame $$g_x = -g \cdot \sin\theta \cdot \cos\phi \quad (6)$$

$$g_y = g \cdot \sin\theta \cdot \sin\phi \quad (7)$$

$$g_z = g \cdot \cos\theta \quad (8)$$

Thus, the highside angle $\phi$ can be determined from $$\frac{\sin}{\cos} = \frac{g_y}{-g_x} \quad (9)$$

and the inclination angle $\theta$ from, $$\frac{\sin\theta}{\cos\theta} = \frac{(g_x^2 + g_y^2)^{\frac{1}{2}}}{g_z} \quad (10)$$

The next step is to calculate the azimuth angle from the inclination angle $\theta$, the highside angle and the magnetic field components $B_x$, $B_y$ and $B_z$. Use of the Vector Operation Equation 1 to operate on the magnetic field vector $$\begin{bmatrix} B_x \\ B_y \\ B_z \end{bmatrix}$$

yields the following magnetic field components in the ONEV frame, $$B_N = \cos\psi \cdot \{\cos\theta \cdot (B_x \cdot \cos\phi - B_y \cdot \sin\phi) + B_z \cdot \sin\theta\} - \sin\psi \cdot (B_x \cdot \sin\phi + B_y \cdot \cos\phi) \quad (11)$$

$$B_e = \sin\psi \cdot \{\cos\theta \cdot (B_x \cdot \cos\phi - B_y \cdot \sin\phi) + B_z \cdot \sin\theta\} + \cos\psi \cdot \{B_x \cdot \sin\phi + B_y \cdot \cos\phi\} \quad (12)$$

$$B_V = -\sin\theta \cdot \{B_x \cdot \cos\phi - B_y \cdot \sin\phi\} + B_z \cdot \cos\theta \quad (13)$$

The instrument sensors measure local field components within a "non-magnetic" drill collar which is itself part of the drill string close to the drilling bit. If the local magnetic field vector at the instrument location is solely that of the earth's magnetic field then $\psi$ will be the true azimuth at the location with respect to the earth's magnetic north direction. Since $B_E$ under these conditions is zero then the azimuth can be determined from Equation 12 by $$\frac{\sin\psi}{\cos\psi} = \frac{-(B_x \cdot \sin\phi + B_y \cdot \cos\phi)}{\cos\theta \cdot (B_x \cdot \cos\phi - B_y \cdot \sin\phi) + B_z \cdot \sin\theta} \quad (14)$$

In practice, the local earth's magnetic field vector at the location is modified by the effect of the attachments above and below the non-magnetic section of drill collar. As stated above, it is a reasonable assumption that the modification to the local earth's magnetic field vector is to a close approximation an error vector $\overline{E}$ in the direction of drill string; i.e., the direction of $\overline{E}$ is defined by the ($\psi$, $\theta$) set. In order to correct this error the uncorrected (measured) azimuth $\psi_m$ is first determined from Equation 14. $B_{NM}$ and $B_{VM}$ are then determined from Equations 11 and 13 respectively where $B_{NM}$, $B_{EM}$ and $B_{VM}$ are the measured components in the (ONEV) measured frame.

Referring to FIG. 7, where the line 36 indicates the intersection of the hole azimuth plane and the horizontal plane, if the correction to the true azimuth is represented by $\psi_c$ then the true earth's magnetic field vector $\bar{B}$ and the measured local magnetic field vector $\bar{B_M}$ can be represented by $$\bar{B} = B_N \cdot \bar{U_N} + B_V \cdot \bar{U_V} \quad (15)$$

and $$\bar{B_M} = B_{NM} \cos \psi_c \cdot \bar{U_N} + B_{NM} \sin \psi_c \cdot \bar{U_E} + B_{VM} \cdot \bar{U_V} \quad (16)$$

The error vector $\bar{E}$ is given by $$\bar{E} = \bar{B_M} - \bar{B} \quad (17)$$

which can then be written $$\bar{E} = (B_{NM} \cos \psi_c - B_N) \cdot \bar{U_N} + B_{NM} \sin \psi_c \cdot \bar{U_E} + (B_{VM} - B_V) \cdot \bar{U_V} \quad (18)$$

Since $\bar{E}$ lies along the OZ direction, the Vector Operation Equation 1 applied to the vector $$\begin{bmatrix} 0 \\ 0 \\ E \end{bmatrix}$$

yields $$\bar{E} = E \sin \theta \cdot \cos \psi \cdot \bar{U_N} + E \sin \theta \cdot \sin \psi \cdot \bar{U_E} + E \cos \theta \cdot \bar{U_V} \quad (19)$$

Thus, from Equations 18 and 19

$$B_{NM} \cos \psi_c - B_N = E \sin \theta \cdot \cos \psi \quad (20)$$

$$B_{NM} \sin \psi_c = E \sin \theta \cdot \sin \psi \quad (21)$$

$$B_{VM} - B_V = E \cos \theta \quad (22)$$

Equations 20, 21 and 22 yield $$\frac{\sin \psi_c}{\cos \psi_c} = \frac{(B_{VM} - B_V) \cdot \tan \theta \cdot \sin \psi}{(B_{VM} - B_V) \cdot \tan \theta \cdot \cos \psi + B_N} \quad (23)$$

from which the correction to the azimuth angle $\psi_c$ can be derived. The values of $B_V$ and $B_N$ can be obtained from published geomagnetic survey data. To a first order approximation the true azimuth angle may be replaced by the measured azimuth angle $\psi_m$ in Equation 23. Thus, the azimuth correction angle $\psi_c$ can be calculated from $$\frac{\sin \psi_c}{\cos \psi_c} = \frac{(B_{VM} - B_V) \cdot \tan \theta \cdot \sin \psi_m}{(B_{VM} - B_V) \cdot \tan \theta \cdot \cos \psi_m + B_N} \quad (24)$$

and the corrected azimuth can be calculated from $$\psi = \psi_m + \psi_c \ldots \quad (25)$$

Thus the single direction, in which the component of the earth's magnetic field must be determined, is the vertical.

Equation 24 is convenient to mechanise in the computing but suffers from the limitation that $\cos \theta$ and $(B_{VM} - B_V)$ approach zero when the inclination approaches 90°. The following expressions are preferable for computer mechanization:

(a) Calculate $B_Z$ from $B_Z = B_N \cos \psi_m \sin \theta + B_V \cos \theta$ (26)

(b) Calculate the error vector magnitude
$E = B_{ZM} - B_Z$ (27)

(c) Calculate the correction to the azimuth from $$\frac{\sin \psi_c}{\cos \psi_c} = \frac{E \cdot \sin \theta \cdot \sin \psi_m}{E \cdot \sin \theta \cdot \cos \psi_m + B_N} \quad (28)$$

In this case, the single direction, in which the component of the earth's magnetic field must be determined, is that of the axis of the borehole.

If desired, the corrected azimuth $\psi$ can be substituted for the measured value $\psi_m$ in Equation 24 and a further corrected azimuth value calculated, thereby reducing the error caused by using Equation 24 instead of Equation 23. This iterative process may be repeated as many times as desired to obtain the required accuracy although in general one iteration will be sufficient. An equivalent iterative process can be applied to Equation 28.

Measurement of the local magnetic and gravitational field components in the instrument case-fixed frame thus provides sufficient information to determine a corrected azimuth value provided that the effect of the drill string is to modify the earth's magnetic vector essentially by an error vector which is in the direction of the axis of the drill string.

The choice of expression for the calculation of corrected azimuth is concerned with the consideration of errors due to inaccuracies in the measured parameters and errors due to the inaccuracy in estimating earth's field parameters from geomagnetic data. It can be demonstrated that calculations of the corrected azimuth directly are highly dependent on the instrument scale factor accuracy and that large errors occur in certain situations given the scale factor accuracies achievable at the present time (1% of total vector).

From error considerations the currently preferred methods are those which involve a measurement of the magnitude of the error vector E, for example using equation 28.

With $K = E/B_N$, Equation 28 can be written $$\frac{\sin \psi_c}{\cos \psi_c} = \frac{K \cdot \sin \theta \cdot \sin \psi}{K \cdot \sin \theta \cdot \cos \psi + 1} \quad (29)$$

The fractional error in $B_N$ due to reading accuracy in geomagnetic data will be of the order of about 0.5%/cos $\delta$ where $\delta$ is the dip angle. Thus, while this term becomes very significant at high dip angles, even with a dip angle of 85° its contribution to the fractional error in K is only about 5%.

The fractional error in K is mainly concerned with the fractional error in the measurement of the error vector E. While this term is also dependent on the geomagnetic estimate of $B_N$, the error in measuring E is principally concerned with the accuracy of the instrument scale factor and, for existing instruments it is estimated that the accuracy in estimating E is of the order of 1% of $B_T$ where $B_T$ is the magnitude of the earth's total magnetic field vector.

The criterion for whether or not the correction procedure is used is clearly that the fractional error in $\psi_c$ should not exceed 100%. Thus, as an order of magnitude estimate, the correction should not be applied if the magnitude of the error vector E becomes less or equal to about 1% of the earth's total field $B_T$.

The preferred form of the invention, using three fluxgates and three accelerometers as described above, has the advantage of not requiring any accurately pivoted components, the only moving parts being the proof masses of the accelerometers. However, the invention can also be used to provide means for compensating for the error vector in the earth's magnetic field when using conventional pivoted single-shot and multi-shot compass instruments. In this case, a single fluxgate is arranged to measure the component of the earth's magnetic field $B_{ZM}$ in the direction of the axis of the borehole. The inclination angle $\theta$ and the azimuth angle $\psi_m$ is measured by the pivoted compass instrument. $B_N$ and $B_V$ are obtained from published geomagnetic survey data and used in conjunction with $\theta$ to determine $B_Z$. Equations 27 and 28 are then used to determine E and $\psi_m$.

If geomagnetic survey data is not available, the probe itself may be used to measure $B_N$ and $B_V$, the measurement being made at a location close to the top of the borehole but sufficiently remote from any ferromagnetic structure which may cause the true earth's magnetic field to be modified.

Instead of using a battery power supply and downhole memory storage as described above, a wire line connection to the surface may be used for power supply and signalling purposes.

We claim:

1. A method of determining the orientation of a surveying instrument in a borehole comprising the steps of determining the inclination angle of the instrument at the location thereof in the borehole, sensing, at said location, at least one vector component of the local magnetic field to determine the local magnetic field in the direction of a primary axis of the instrument aligned with the borehole, determining the azimuth angle of the instrument relative to the apparent magnetic north direction at said location, ascertaining the true horizontal and vertical components of the earth's magnetic field at the location of the borehole and determining the correction to be applied to the apparent azimuth angle from the true and apparent values for the horizontal and vertical components of the earth's magnetic field.

2. A method of according to claim 1, further comprising the steps of determining the highside angle of the instrument at the location thereof in the borehole and determining, from said sensed components of the local magnetic field, the vertical magnetic field component, the horizontal magnetic field component in the apparent magnetic north direction and the azimuth angle of the instrument relative to said apparent magnetic north direction.

3. A method according to claim 2, wherein determination of the correction to be applied to the apparent azimuth angle includes calculating the different between the components of the true earth's magnetic field and of the local magnetic field in a single predetermined direction at an angle of less than 90° to the primary axis of the instrument.

4. A method according to claim 3, wherein said single predetermined direction is the vertical direction.

5. A method according to claim 3, wherein said single predetermined direction is the primary axis of the instrument.

6. A method according to claim 2, wherein the vector components of the local magnetic field are determined using three fluxgates oriented in respective non-coplanar directions.

7. A method according to claim 2, wherein the inclination and highside angles are determined by measuring components of gravity in three non-coplanar directions.

* * * * *